United States Patent Office 3,178,299
Patented Apr. 13, 1965

3,178,299
SELF-HARDENING WATER GLASS CEMENT COMPOSITION
Wolfgang Wilborn, Eppstein, Taunus, Germany, assignor to Farbwerke Hoechst Aktiengesellschaft vormals Meister Lucius & Brüning, Frankfurt am Main, Germany, a corporation of Germany
No Drawing. Filed July 24, 1962, Ser. No. 212,162
Claims priority, application Germany, Aug. 5, 1961, F 34,616
7 Claims. (Cl. 106—84)

Objects of this invention are a self-hardening water glass cement composition comprising a mixture of an inert filler, an alkali silicate and a suitable hardener, and a composition consisting essentially of two unmixed components which upon admixture, form such self-hardening water glass cement composition.

It is known to use salts of fluosilicic acid for hardening water glass cement compositions. The use of these salts has the disadvantage that hydrofluoric acid may be liberated from the hardened cement composition by the action of strong acids and heat. The hydrofluoric acid impairs either the adhesion of the acid-proof bricks laid with the use of the cement composition, or the adhesion of the water glass cement composition to metal, for example lead, steel or refined steel. In the course of distillation processes, the liberated hydrofluoric acid is removed from the lined vessel and condenses on colder parts of the apparatus where it causes corrosion.

It has also been proposed to add phosphoric acid compounds to water glass cement compositions in order to strengthen the cement composition and to accelerate setting. It is furthermore known that an addition of phosphoric acid or its acid salts in the presence of $SiO_2$ has a cementing action.

It is also known to use anhydrides of organic acids, inner esters of glycollic acid and amides of fatty acids for hardening water glass cement compositions, i.e., compositions of water glass solutions and inert fillers, for example quartz powders.

Now I have found that a condensation product of boric acid and phosphoric acid is a particularly good hardener for water glass cement compositions and imparts excellent properties hitherto unknown in water glass cement compositions.

In accordance with the invention, a condensation product of boric acid and phosphoric acid is used, in which the molar ratio of $H_3BO_3:H_3PO_4$ is within the range of 0.8 to 1.2, amounts advantageously to 1.0. Especially borophosphoric acid products which have first been prepared as fully water-soluble borophosphoric acids and have subsequently been subjected to a thermal after-treatment, possess favorable hardening properties.

If the above-mentioned range of molar ratio is not observed, the working time of the cement compositions prepared with the use of such hardeners is unfavorably reduced.

In preparing the above-mentioned hardener it is advantageous to proceed, for example, as follows: Boric acid ($H_3BO_3$) of fine particle size and aqueous ortho-phosphoric acid ($H_3PO_4$ of 70 to 100% strength) in a molar ratio of $H_3BO_3:H_3PO_4$ within the range of about 0.8 to about 1.2, advantageously 1.0, are made into a paste with the help of a rapid stirrer and dried at a temperature of about 65° to about 110° C., advantageously 80° to 100° C. under reduced pressure. The intermediate product so obtained constitutes a fully water-soluble borophosphoric acid which can be converted into crystallized, completely dehydrated borophosphate by calcination at temperatures above 1000° C. In accordance with the invention it is advantageous, however, to convert the borophosphoric acid obtained not completely into crystallized borophosphate ($BPO_4$) but to carry out the calcination at a temperature between about 300° and 1000° C., advantageously between 600° and 850° C. By an appropriate choice of the calcination temperature, the properties of the hardener can be adjusted in a manner such that the water glass cement composition of the invention meets the requirements made as to working time and time for setting. Since the condensation product prepared as described above is not yet the absolutely anhydrous borophosphate ($BPO_4$) and may still contain acid hydrogen groups, it will be referred to hereinafter as "calcined, borophosphoric acid."

In preparing the water glass cement compositions of the invention, it is advantageous to use the hardener in an amount of about 1 to about 10% by weight, advantageously about 1.5 to about 4% by weight, calculated on the mixture consisting of inert filler and hardener.

As an inert filler for the self-hardening water glass cement compositions of the invention there may be used all materials known for this purpose such as, for example, silicon dioxide in its various crystallographic forms (quartz, cristobalite, etc.), aluminum silicates such as, for example, kaolin and other clays, as well as silicon carbide, heavy spar, etc., while the choice of the respective filler or mixture of fillers can be adapted to the specific requirements made on the water glass cement composition in a given case.

As alkali silicate, soda water glass and/or potash water glass is used, as is usual for water glass cement compositions. By water glass there are meant sodium- or potassium silicates of the formula $Na_2O(K_2O) \cdot 3$–$4SiO_2$ in the form of a viscous water-clear colorless liquid.

The water glass cement composition of the invention is resistant to acids in any concentration, except hydrofluoric acid. The water glass cement composition of the invention has the particular advantage over the known water glass cement compositions that the hardened cements do not require after-treatment with an acid or a magnesium-silico-fluoride solution, as was necessary with the known water glass cement compositions, and that they are resistant even to water of any temperature, without being subjected to any after-treatment.

The following examples serve to illustrate the invention but they are not intended to limit it thereto, the parts being by weight.

Example 1

For preparing the condensation product of boric acid and phosphoric acid serving as the hardener, 371 grams of pure boric acid ($H_3BO_3$) of fine particle size (passed through a sieve of a mesh width of 0.125 millimeter) were thoroughly mixed with the help of a rapid stirrer with 651 grams of pure phosphoric acid which had been obtained from a commercial polyphosphoric acid by diluting the latter with water to a concentration of 90.4% of $H_3PO_4$, corresponding to a density of 1.749 at 25° C. During mixing, about 30 grams of water were added, the mixture having a temperature of about 35° C. The mixture so obtained which had a pasty consistency was dried at 95° C. for 24 hours in flat dishes in a vacuum drier. A brittle material having the form of shards was obtained which was ground and constituted a fully water-soluble borophosphoric acid. The product was then calcined for 1 hour at 700° C. (in the following examples at different other temperatures) and ground to a particle size of less than 0.5 millimeter.

2.5 parts of the borophosphoric acid hardener prepared as described above were thoroughly mixed with 2.5 parts of kaolin, 47.5 parts of quartz powder W 10 and 47.5 parts of quartz powder GM on an appropriate mixing device. The mixture so obtained, referred to hereinafter as "cement powder" was then mixed with 37 parts of soda water glass containing 7.5 parts of $Na_2O$, 25.5 parts of $SiO_2$ and 67 parts of $H_2O$, and having a specific gravity of 1.33 (20° C.) and a viscosity of about 38 centipoises (20° C.) to obtain an easily workable plastic cement composition which was free from cavities.

The following table indicates the particle size distribution of the inert fillers used for the cement powder in this example and in the following examples.

| Sieve mesh width, mm. | Quartz powder W 10, percent | Quartz powder GM, percent | Kaolin, percent | Silicon carbide, percent | Heavy spar, percent |
|---|---|---|---|---|---|
| 0.6–0.3 | 0.02 | 2.40 | 0.00 | 20.20 | 0.00 |
| 0.3–0.15 | 0.06 | 32.00 | 0.00 | 42.20 | 1.40 |
| 0.15–0.10 | 0.30 | 35.00 | 0.02 | 28.45 | 30.00 |
| 0.10–0.08 | 2.88 | 10.00 | 0.04 | 8.80 | 32.60 |
| 0.08–0.06 | 5.40 | 6.20 | 2.20 | 6.60 | 28.80 |
| <0.06 | 91.34 | 14.40 | 97.74 | 4.80 | 7.20 |

The working time of the cement composition amounted to 25 minutes and the time for setting was 24 hours.

The water glass cement composition obtained as described above could primarily be used for laying acid-proof bricks in reaction towers in which hydrochloric acid, nitric acid or substances splitting off these compounds were present. The hardened cements prepared with this cement composition were distinguished by a high compressive strength, good adhesion and by the fact that the joints of the lining were neither attacked by cold nor by hot water even when water was the first agent to the action of which, instead of acid, the lined vessel was exposed.

*Example 2*

100 parts of a cement powder consisting of 1.7 parts of a borophosphoric acid hardener calcined at 600° C. for 1 hour, 2.3 parts of kaolin, 48.5 parts of quartz powder W 10 and 48.5 parts of quartz powder GM, were mixed with 38 parts of the soda water glass used in Example 1 to obtain an easily workable plastic cement composition. The working time of the cement composition amounted to 35 minutes, the time for setting was 24 hours.

*Example 3*

The cement powder described in Example 1 was mixed with a potash water glass consisting of 11.2% of $K_2O$, 24.5% of $SiO_2$ and 64.3% of water and having a specific gravity of 1.32, to obtain an easily workable plastic cement composition, about 37 parts of potash water glass being needed for 100 parts of cement powder. The cement composition so obtained was used for lining a steel container for sulfuric acid.

The cement composition had a working time at 20° C. of about 25 minutes, the time for setting was about 24 hours.

The hardened cement showed an excellent resistance to acid and water, and a very good adhesion to metal parts which remained unchanged during the use of the steel container. No corrosion occurred on the contact surface.

*Example 4*

In a manner analogous to that described in the preceding examples, 100 parts of a cement powder consisting of 8.0 parts of a borophosphoric acid hardener calcined at 950° C. for 1 hour, 2.0 parts of kaolin, 35.0 parts of quartz powder W 10, 35.0 parts of quartz powder GM and 10.0 parts of silicon carbide, were mixed with 45 parts of the potash water glass used in Example 3 to obtain an easily workable plastic cement composition. The working time of the cement composition amounted to 45 minutes, the time for setting was 48 hours.

The water glass cement composition so obtained was especially suitable for cases in which, in addition to a good resistance to acid, also a high resistance to changes in temperature was required.

*Example 5*

100 parts of a cement powder consisting of 5.0 parts of a borophosphoric acid hardener calcined at 850° C. for 1 hour, 5.9 parts of heavy spar powder, 40.5 parts of quartz powder W 10 and 40.5 parts of quartz powder GM, were mixed with 39 parts of the soda water glass used in Example 1, to obtain a plastic cement composition. The working time of the cement composition amounted to 20 minutes, the time for setting was 18 hours.

The water glass cement composition so obtained was especially suitable for use in cases in which, in addition to a good resistance to acid, a good adhesion to glass, or glazed or enamelled surfaces was required.

I claim:

1. A self-hardening water glass cement composition consisting essentially of an inert filler, about 37 to 45 parts by weight per 100 parts of said filler of an alkali silicate having an $SiO_2$ to alkali oxide ratio in the range of about 3 to 4:1 and as hardener a condensation product of boric acid and phosphoric acid in which the molar ratio of $H_3BO_3:H_3PO_4$ is within the range of 0.8 to 1.2, the proportion of said condensation product in the composition being within the range of 1 to 10% by weight calculated on the total weight of inert filler and hardener.

2. A self-hardening water glass cement composition as described in claim 1, in which said hardener is a condensation product of boric acid and phosphoric acid, the molar ratio of $H_3BO_3:H_3PO_4$ being 1.

3. A self-hardening water glass cement composition as described in claim 1, in which the proportion of said condensation product is within the range of 1.5 to 4% by weight calculated on the total weight of inert filler and hardener.

4. A composition consisting essentially of two unmixed components which upon admixture form a self-hardening water glass cement composition, said components comprising
 (A) about 37 to 45 parts by weight of an alkali silicate having an $SiO_2$ to alkali oxide ratio in the range of about 3 to 4:1 and
 (B) 100 parts by weight of in inert filler and from 1 to 10% by weight of a condensation product of boric acid and phosphoric acid having a molar ratio of $H_3BO_3:H_3PO_4$ within the range of 0.8 to 1.2.

5. A self-hardening water glass cement composition consisting essentially of an inert filler selected from the group consisting of silicon dioxides, aluminum silicates, silicon carbide and heavy spar, about 37 to 45 parts by weight per 100 parts of said filler of an alkali silicate selected from the group consisting of sodium and potassium silicates having an $SiO_2$ to alkali oxide ratio in the range of about 3 to 4:1, and a hardener which is the condensation product of from about 0.8 to 1.2 mols of boric acid per mol of phosphoric acid and which is used in an amount within the range of about 1% to 10% by weight calculated on the total weight of said filler and said hardener.

6. A self-hardening water glass cement composition consisting essentially of about 37 to 45 parts by weight of an alkali silicate selected from the group consisting of sodium and potassium silicates having an $SiO_2$ to alkali oxide ratio in the range of about 3 to 4:1 per 100 parts by total weight of an inert filler selected from the group consisting of silicon dioxides, aluminum silicates, silicon carbide and heavy spar and a hardener which is the condensation product of from about 0.8 to 1.2 mols of boric acid per mol of phosphoric acid, said hardener being used in an amount within the range of about 1% to 10% by weight calculated on the total weight of said filler and said hardener.

7. A method of hardening water glass cement compositions consisting essentially of an inert filler, about 37 to 45 parts by weight per 100 parts of said filler of an alkali silicate having an $SiO_2$ to alkali oxide ratio in the range of about 3 to 4:1 and a hardener which comprises using as a hardener the condensation product of from about 0.8 to 1.2 mols of boric acid per mol of phosphoric acid, said hardener being used in an amount within the range of about 1% to 10% by weight calculated on the total weight of said filler and said hardener.

References Cited by the Examiner

UNITED STATES PATENTS

| | | | |
|---|---|---|---|
| 1,408,960 | 3/22 | Schiff | 106—74 |
| 1,578,813 | 3/26 | Dawes et al. | 106—84 |
| 1,975,078 | 10/34 | Boughton | 106—74 |
| 2,077,258 | 4/37 | Pitt | 106—74 |
| 2,375,638 | 5/45 | Englund | 23—139 |
| 2,646,344 | 7/53 | Kamlet | 23—105 |
| 2,964,415 | 12/60 | Payne et al. | 106—74 |
| 3,002,857 | 10/61 | Stalego | 106—74 |

OTHER REFERENCES

Mellor: "Comprehensive Treatise on Inorganic and Theoretical Chemistry," vol. 5, Longmans, Green and Company, New York, 1924, page 147.

TOBIAS E. LEVOW, *Primary Examiner.*

JOSEPH REBOLD, *Examiner.*